(12) United States Patent
Robinette

(10) Patent No.: US 9,382,975 B2
(45) Date of Patent: Jul. 5, 2016

(54) TRIPLE INPUT CLUTCH TRANSMISSION

(71) Applicant: GM Global Technology Operations LLC, Detroit, MI (US)

(72) Inventor: Darrell Lee Robinette, Brighton, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/449,267

(22) Filed: Aug. 1, 2014

(65) Prior Publication Data

US 2015/0040705 A1 Feb. 12, 2015

Related U.S. Application Data

(60) Provisional application No. 61/864,736, filed on Aug. 12, 2013.

(51) Int. Cl.
| | |
|---|---|
| *F16H 3/08* | (2006.01) |
| *F16H 3/097* | (2006.01) |
| *F16H 3/093* | (2006.01) |
| *F16H 3/00* | (2006.01) |

(52) U.S. Cl.
CPC ............... *F16H 3/093* (2013.01); *F16H 3/006* (2013.01); *Y10T 74/19228* (2015.01)

(58) Field of Classification Search
CPC . F16H 3/006; F16H 2003/0931; F16H 3/091; F16H 47/02
USPC .................................... 74/330, 331, 333, 340
See application file for complete search history.

(56) References Cited

U.S. PATENT DOCUMENTS

| | | | | |
|---|---|---|---|---|
| 4,132,133 | A * | 1/1979 | Ballendux | F16H 3/02 74/745 |
| 7,695,390 | B2 | 4/2010 | Phillips | |
| 8,532,858 | B1 * | 9/2013 | Robinette | B60K 6/442 701/22 |
| 8,747,274 | B2 | 6/2014 | Phillips | |
| 8,857,284 | B2 * | 10/2014 | Kahl | F16H 3/006 74/330 |
| 2008/0070742 | A1 * | 3/2008 | Phillips | F16H 37/0833 475/331 |
| 2011/0139563 | A1 * | 6/2011 | Kang | B60W 10/02 192/3.54 |
| 2012/0160044 | A1 * | 6/2012 | Kahl | F16H 3/006 74/330 |
| 2014/0128212 | A1 | 5/2014 | Phillips | |

FOREIGN PATENT DOCUMENTS

KR 2005042671 * 5/2005

OTHER PUBLICATIONS

Pending U.S. Appl. No. 14/102,062, filed Dec. 10, 2013, by Andrew W. Phillips all pages.

* cited by examiner

*Primary Examiner* — Ha D Ho

(57) ABSTRACT

A transmission has a three input torque-transmitting mechanism, such as friction clutches, to achieve torque flow through a countershaft gearing arrangement. The transmission includes an input member, an output member, an input clutch assembly having three input clutches and a countershaft gearing arrangement. The countershaft gearing arrangement is operatively connected with the input clutch assembly and includes: co-planar intermeshing gear sets, first and second countershafts, first, second and third intermediate input shafts.

15 Claims, 5 Drawing Sheets

| GEAR | 116 | 114 | 112 | 120 | 122 | 126 | 124 | RATIO | COL.14 |
|---|---|---|---|---|---|---|---|---|---|
| REV  |   |   | X | X | O |   | X | -3.899 |     |
| N    |   |   |   | O | O |   | O |        |     |
| 1ST  |   |   | X | X | X |   | X | 5.520  | C2C |
| 2ND  |   | X |   | X | O |   | X | 4.410  | C2C |
| 3RD  |   | X |   |   | O | X | O | 3.378  | C2C |
| 4TH  |   | X |   |   | X | X | O | 2.698  | C2C |
| 5TH  | X |   |   | O | O |   | X | 2.069  | C2C |
| 6TH  |   | X |   | O | X |   | X | 1.648  | C2C |
| 7TH  | X |   |   | O | X | X |   | 1.304  | C2C |
| 8TH  |   | X |   |   | O | X | O | 1.038  | C2C |
| 9TH  |   | X |   |   | X | X | O | 0.829  | C2C |
| 10TH | X |   |   | O | O |   | X | 0.636  | C2C |
| 11TH |   | X |   | O | X |   | X | 0.506  | C2C |
| 12TH | X |   |   | X | X | X |   | 0.389  | C2C |
|      |   |   |   |   |   |   |   |        |     |
| UD1  |   | X |   | X | X | X |   | 9.041  | TNS |
| UD2  | X |   |   |   | X | X |   | 4.242  | TNS |
| UD3  |   | X |   | X | X | X |   | 2.779  | TNS |
| UD4  | X |   |   | X | X | X |   | 1.266  | TNS |
| UD5  |   |   | X | X | X |   | X | 1.697  | TNS |
| UD6  | X |   |   | X |   |   | X | 1.355  | TNS |
|      |   |   |   |   |   |   |   |        |     |
| RUD1 |   |   | X | X |   | X | X | -7.993 |     |
| RUD2 |   |   | X | X |   | X | X | -2.457 |     |
| RUD3 |   |   | X | X | X | X |   | -2.386 |     |
| RUD4 |   |   | X | X |   |   | X | -1.198 |     |
| ROD1 |   |   | X | X | X |   | X | -0.733 |     |

X = CARRYING TORQUE
O = ENGAGED CARRYING NO TORQUE (PRESELECTED)
C2C = CLUTCH TO CLUTCH SHIFT (POWER ON)
TNS = THROUGH NEUTRAL SHIFT (POWER INTERRUPT)

FIG. 2

| GEAR | 116 | 114 | 112 | 120 | 122' | 126 | 124 | RATIO | COL.13 |
|------|-----|-----|-----|-----|------|-----|-----|-------|--------|
| REV  |     |     | X   | X   |      |     | X   | -3.997 |        |
| N    |     |     |     |     | O    | O   |     |       |        |
| 1ST  |     | X   |     | X   | X    |     |     | 4.963 |        |
| 2ND  | X   |     |     | X   | X    | X   |     | 3.955 | C2C    |
| 3RD  |     | X   |     | O   | X    |     | O   | 3.253 | C2C    |
| 4TH  |     | X   |     | X   | O    |     | X   | 2.698 | C2C    |
| 5TH  | X   |     |     |     | O    | O   | X   | 2.151 | C2C    |
| 6TH  |     | X   |     | O   | X    | X   |     | 1.707 | C2C    |
| 7TH  | X   |     |     | X   | X    | X   |     | 1.360 | C2C    |
| 8TH  |     | X   |     | O   |      | X   | O   | 1.119 | C2C    |
| 9TH  |     | X   |     | X   |      | O   | X   | 0.928 | C2C    |
| 10TH | X   |     |     | O   | O    |     | X   | 0.740 | C2C    |
| 11TH |     | X   |     | X   | X    |     | X   | 0.608 | C2C    |
|      |     |     |     |     |      |     |     |       |        |
| UD1  |     | X   | X   | X   |      |     | X   | 5.984 | TNS    |
|      |     |     |     |     |      |     |     |       |        |
| RUD1 |     |     | X   | X   | X    | X   |     | -2.162 |       |
| RUD2 |     |     | X   | X   |      |     | X   | -1.367 |       |
| ROD1 |     |     | X   | X   | X    | X   |     | -0.743 |       |

X = CARRYING TORQUE
O = ENGAGED CARRYING NO TORQUE (PRESELECTED)
C2C = CLUTCH TO CLUTCH SHIFT (POWER ON)
TNS = THROUGH NEUTRAL SHIFT (POWER INTERRUPT)

FIG. 5

TRIPLE INPUT CLUTCH TRANSMISSION

CROSS-REFERENCE TO RELATED APPLICATIONS

This application claims the benefit of U.S. Provisional Application No. 61/864,736 filed Aug. 12, 2013. The disclosure of the above application is incorporated herein by reference.

TECHNICAL FIELD

The invention relates to a multi-speed transmission having a triple input clutch selectively connectable to a countershaft gearing arrangement.

BACKGROUND

A typical multi-speed, multi-input clutch transmission uses a combination of friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio (with the exception of being able to achieve a direct drive ratio in a rear wheel drive application). Accordingly, the total number of gears required in this typical design is two times the number of forward speeds, plus three for reverse. This necessitates a large number of required gear pairs, especially in transmissions that have a relatively large number of forward speed ratios. Thus, a need exists for a more compact efficient transmission that utilizes gear pairs.

SUMMARY

A transmission is provided having a triple input torque-transmitting mechanism, such as friction clutches, to achieve torque flow through a countershaft gearing arrangement. The transmission includes an input member connected to the triple input clutch assembly having a first, second and third torque-transmitting mechanisms, each of the torque-transmitting mechanisms are connected to a countershaft gearing arrangement.

In yet another embodiment of the present transmission, the transmission includes an input member, an output member, a first intermediate input shaft, a second intermediate input shaft. The second intermediate input shaft is concentric with the first intermediate shaft and a third intermediate input shaft. The third intermediate input shaft is concentric with the second intermediate shaft.

In yet another embodiment of the present transmission, the transmission includes a clutch assembly having a first, a second and a third torque-transmitting mechanism each selectively engageable to connect the input member with a respective different one of the first intermediate input shaft, second intermediate input shaft and third intermediate input shaft.

In yet another embodiment of the present transmission, the transmission includes a first countershaft and a second countershaft radially offset from the intermediate input shafts.

In yet another embodiment of the present transmission, the transmission includes a first countershaft transfer gear connected for common rotation with the first countershaft and in communication with the output member to transfer torque from the first countershaft to the output member.

In yet another embodiment of the present transmission, the transmission includes a second countershaft transfer gear connected for common rotation with the first countershaft and in communication with the output member to transfer torque from the first countershaft to the output member.

In yet another embodiment of the present transmission, the transmission includes a third countershaft transfer gear connected for common rotation with the second countershaft and in communication with the output member to transfer torque from the second countershaft to the output member.

In yet another embodiment of the present transmission, the transmission includes a fourth countershaft transfer gear connected for common rotation with the second countershaft and in communication with the output member to transfer torque from the second countershaft to the output member.

In yet another embodiment of the present transmission, the transmission includes at least five co-planar intermeshing gear sets, wherein at least one of the gears of the at least five co-planar intermeshing gear sets is fixed for common rotation with at least one of the intermediate input shafts.

In yet another embodiment of the present transmission, the transmission includes a plurality of synchronizers, wherein at least one of the plurality of synchronizers is selectively engagable to connect at least one of the gears of the at least five co-planar intermeshing gear sets with at least one of the first and second countershafts for common rotation therewith.

In yet another embodiment of the present transmission, the combination of engagement of the at least one of the first, the second and the third torque-transmitting mechanism and at least one of the synchronizers transfers torque from the input member to the output member to establish a plurality of gear speeds.

In yet another embodiment of the present transmission, the countershaft gearing arrangement is operatively connected with the triple input torque-transmitting mechanism and includes: a plurality of sets of co-planar intermeshing gears, a first intermediate shaft, a second intermediate shaft, a third intermediate shaft, a plurality of synchronizers and first and second countershafts.

In yet another embodiment of the present transmission, the first and second countershafts are radially offset from and generally parallel to the intermediate shafts. The plurality of synchronizers are selectively engagable to connect selected ones of the gears of the co-planar gear sets with selected ones of said shafts for common rotation to thereby transfer torque along the shafts and the sets of co-planar intermeshing gears to an output shaft.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a truth table listing the engaged torque-transmitting mechanisms and synchronizers for selected torque ratios achieved by the twelve speed transmission of FIG. 1.

FIG. 5 is a truth table listing the engaged torque-transmitting mechanisms and synchronizers for selected torque ratios achieved by the eleven speed transmission of FIG. 4.

DESCRIPTION OF THE PREFERRED EMBODIMENTS

Figure 1:
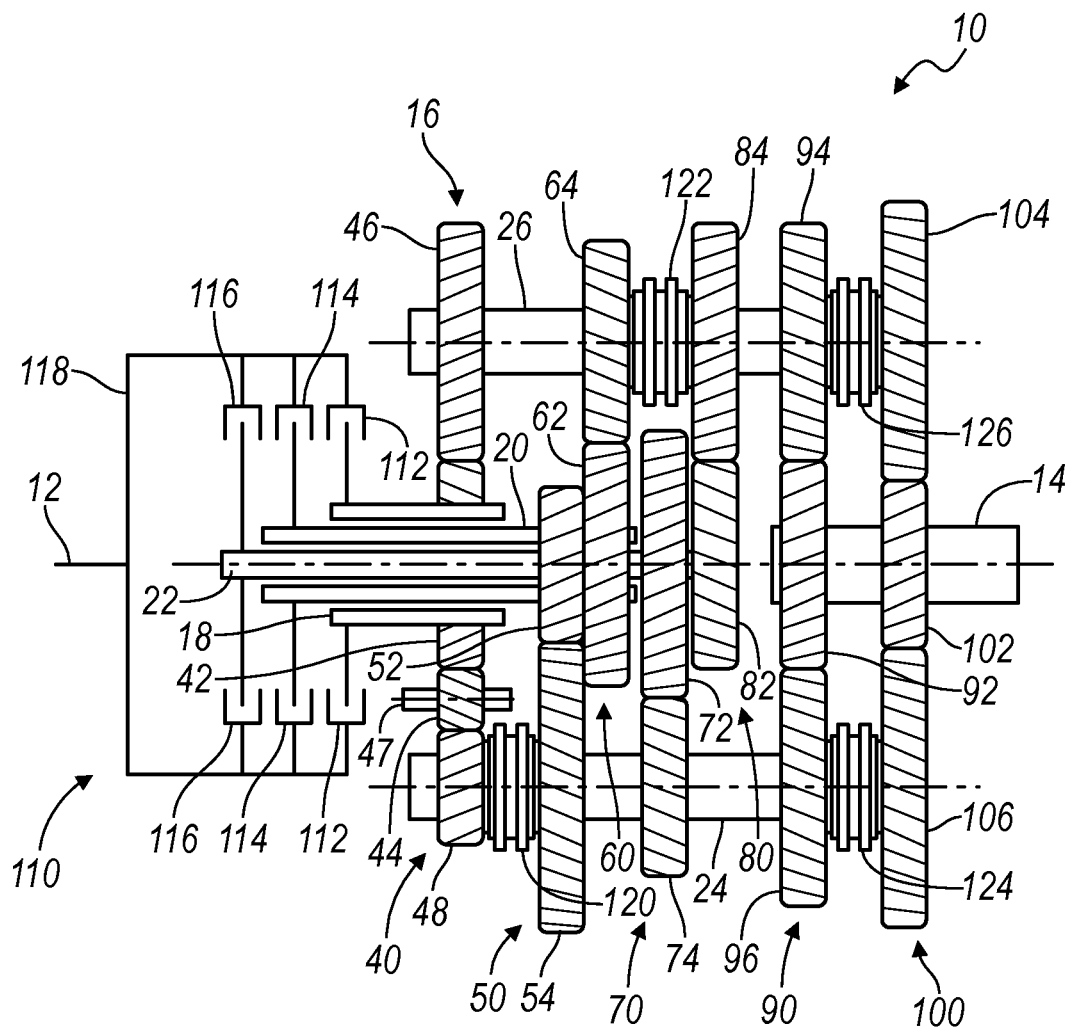
FIG. 1 is a schematic representation of an embodiment of a twelve speed transmission in accordance with the present invention.

Referring to the drawings, wherein like reference numbers refer to like components, in FIG. 1 a multi-speed transmission 10 is depicted. The transmission 10 includes an input member 12 and output member 14. In the present embodiment, input member 12 and output member 14 are shafts, and will be referred to as such. Those skilled in the art will appreciate that the input and output members 12, 14 may be components other than shafts. The input shaft 12 is continuously connected to an engine (not shown) or to a turbine of a torque converter (not shown). The output shaft 14 is continuously connected with a final drive unit (not shown).

Transmission 10 includes a countershaft gearing arrangement 16 that includes intermediate shafts, countershafts, co-planar intermeshing gear sets and selectively engagable synchronizers as will be described herein. For example, the countershaft gearing arrangement 16 includes a first intermediate shaft 18, a second intermediate shaft 20 and a third intermediate shaft 22. First and second intermediate shafts 18, 20 are sleeve shafts that are concentric with the third intermediate shaft 22. The countershaft gearing arrangement 16 further includes a first countershaft 24 and a second countershaft 26. Countershaft 24 is both spaced apart from and parallel with input shaft 12 and intermediate shafts 18, 20 and 22. Countershaft 26 is also spaced apart from and parallel with input shaft 12 and intermediate shafts 18, 20 and 22.

The countershaft gearing arrangement 16 includes co-planar, intermeshing gear sets 40, 50, 60, 70, 80, 90 and 100. Gear set 40 includes gears 42, 44, 46 and 48. Gear 42 is connected for common rotation with first intermediate shaft 18 and intermeshes with gears 44 and 46. Gear 44 is an idler gear that is connected for common rotation with an idler shaft 47. Gear 46 is connected for common rotation with the second countershaft 26. Gear 48 is rotatable about and selectively connectable with the first countershaft 24 and intermeshes with gear 44.

Gear set 50 includes co-planar intermeshing gears 52 and 54. Gear 52 is connected for common rotation with the second intermediate shaft 20 and intermeshes with gear 54. Gear 54 is rotatable about and selectively connectable with the first countershaft 24.

Gear set 60 includes co-planar intermeshing gears 62 and 64. Gear 62 is connected for common rotation with the second intermediate shaft 20 and intermeshes with gear 64. Gear 64 is rotatable about and selectively connectable with the second countershaft 26.

Gear set 70 includes co-planar intermeshing gears 72 and 74. Gear 72 is connected for common rotation with the third intermediate shaft 22 and intermeshes with gear 74. Gear 74 is rotatable about and selectively connectable with the first countershaft 24.

Gear set 80 includes co-planar intermeshing gears 82 and 84. Gear 82 is connected for common rotation with the third intermediate shaft 22 and intermeshes with gear 84. Gear 84 is rotatable about and selectively connectable with the second countershaft 26.

Gear set 90 includes gears 92, 94 and 96. Gear 92 is connected for common rotation with the output shaft 14 and intermeshes with gears 94 and 96. Gear 94 is rotatable about and selectively connectable with the second countershaft 26. Gear 96 is rotatable about and selectively connectable with the first countershaft 24.

Gear set 100 includes gears 102, 104 and 106. Gear 102 is connected for common rotation with the output shaft 14 and intermeshes with gears 104 and 106. Gear 104 is rotatable about and selectively connectable with the second countershaft 26. Gear 106 is rotatable about and selectively connectable with the first countershaft 24.

The transmission 10 further includes a triple input clutch or assembly 110 having three torque-transmitting mechanisms or devices including a first input clutch 112, second input clutch 114 and third input clutch 116. Triple input clutch or assembly 110 has a clutch hub or housing 118 fixedly connected to the input shaft or member 12. Accordingly, first input clutch 112 is selectively engagable to connect the input shaft 12, through clutch housing 118, with the first intermediate shaft 18. Second input clutch 114 is selectively engagable to connect the input shaft 12, through clutch housing 118, with the second intermediate shaft 20. Third input clutch 116 is selectively engagable to connect the input shaft 12, through clutch housing 118, with the third intermediate shaft 22.

The transmission 10 further includes a plurality of selectively engagable synchronizers 120, 122, 124 and 126. Synchronizer 120 is selectively engagable to connect gear 48 with first countershaft 24. Synchronizer 120 is also selectively engagable to connect gear 54 with first countershaft 24 for common rotation therewith. Synchronizer 122 is selectively engagable to connect gear 64 with second countershaft 26 for common rotation therewith. Synchronizer 122 is also selectively engagable to connect gear 84 with second countershaft 26 for common rotation therewith. Synchronizer 124 is selectively engagable to connect gear 96 with first countershaft 24 for common rotation therewith. Synchronizer 124 is also selectively engagable to connect gear 106 with first countershaft 24 for common rotation therewith. Synchronizer 126 is selectively engagable to connect gear 94 to second countershaft 26 for common rotation therewith. Synchronizer 126 is also selectively engagable to connect gear 104 to second countershaft 26 for common rotation therewith.

The transmission 10 is capable of transmitting torque from the input shaft 12 to the output shaft 14 in at least twelve forward torque ratios and one reverse torque ratio as indicated in the truth table of FIG. 2. Each of the forward torque ratios and the reverse torque ratio is attained by engagement of one of the first, second, third torque-transmitting mechanisms or input clutches 112, 114 and 116 and one or more of the synchronizers 120, 122, 124 and 126 as indicated in the table of FIG. 2 by the "x" in the box. Those skilled in the art will readily understand that a different speed ratio is associated with each torque ratio. Thus, at least twelve forward speed ratios may be attained by the transmission 10.

To establish the reverse torque ratio (Gear State Rev 1), the input clutches and synchronizers are selected as set forth in the table of FIG. 2. More specifically, first input clutch 112 and synchronizers 120 and 124 are engaged. The first input clutch 112 connects the first intermediate shaft 18 with the input shaft 12. Torque is thus transferred from the input shaft 12 through the first input clutch 112 to first intermediate shaft 18 to gear 42. Gear 42 transfers the torque to gear 44. Gear 44 transfers the torque to gear 48. Synchronizer 120 connects gear 48 for common rotation with first countershaft 24. Torque is then transferred from the first countershaft 24 to synchronizer 124. Synchronizer 124 transfers the torque to gear 96. Gear 96 transfers torque to gear 92. Gear 92 transfers the torque to the output shaft 14.

A first forward torque ratio (Gear State 1st in the truth table of FIG. 2), is achieved by engaging the first input clutch 112 and synchronizers 120, 122 and 124. The first input clutch 112 connects the first intermediate shaft 18 with the input shaft 12. Torque is thus transferred from the input shaft 12 through the first input clutch 112 to first intermediate shaft 18 to gear 42. Gear 42 transfers the torque to gear 46. Gear 46 transfers the torque to second countershaft 26. Second countershaft 26 transfers torque to synchronizer 122. Synchronizer 122 transfers the torque to gear 64. Gear 64 transfers the torque to gear 62. Gear 62 transfers the torque to gear 52 through second intermediate shaft 20. Gear 52 transfers the torque to gear 54. Gear 54 transfers torque to synchronizer 120. Synchronizer 120 transfers the torque to first countershaft 24. Torque is then transferred from the first countershaft 24 to synchronizer 124. Synchronizer 124 transfers the torque to gear 96. Gear 96 transfers torque to gear 92. Gear 92 transfers the torque to the output shaft 14.

A subsequent forward torque ratio, indicated as Gear State 2nd in FIG. 2, is established by engagement of input clutch 114 and synchronizer 120 and 124. The input clutch 114 connects the second intermediate shaft 20 with the input shaft 12. Torque is thus transferred from the input shaft 12 through the second input clutch 114 to second intermediate shaft 20 to gear 52. Gear 52 transfers the torque to gear 54. Gear 54 transfers torque to synchronizer 120. Synchronizer 120 transfers the torque to first countershaft 24. Torque is then transferred from the first countershaft 24 to synchronizer 124. Synchronizer 124 transfers the torque to gear 96. Gear 96 transfers torque to gear 92. Gear 92 transfers the torque to the output shaft 14.

The subsequent torque ratio, indicated as Gear State 3rd in the truth table of FIG. 2, is established by the engagement of the first input clutch 112 and synchronizer 126. The input clutch 112 connects the first intermediate shaft 18 with the input shaft 12. Torque is thus transferred from the input shaft 12 through the first input clutch 112 to first intermediate shaft 18 to gear 42. Gear 42 transfers the torque to gear 46. Gear 46 transfers the torque to second countershaft 26. Torque is then transferred from the second countershaft 26 to synchronizer 126. Synchronizer 126 transfers the torque to gear 94. Gear 94 transfers torque to gear 92. Gear 92 transfers the torque to the output shaft 14.

The next subsequent forward torque ratio, indicated as Gear State 4th in the truth table of FIG. 2, is established with the engagement of the input clutch 114 and synchronizers 122 and 126. The input clutch 114 connects the second intermediate shaft 20 with the input shaft 12. Torque is thus transferred from the input shaft 12 through the second input clutch 114 to second intermediate shaft 20 to gear 62. Gear 62 transfers the torque to gear 64. Gear 64 transfers torque to synchronizer 122. Synchronizer 122 transfers the torque to second countershaft 26. Torque is then transferred from the second countershaft 26 to synchronizer 126. Synchronizer 126 transfers the torque to gear 94. Gear 94 transfers torque to gear 92. Gear 92 transfers the torque to the output shaft 14.

A subsequent forward torque ratio indicated as Gear State 5th in FIG. 2, is established with the engagement of input clutch 116 and synchronizer 124. The input clutch 116 connects the third intermediate shaft 22 with the input shaft 12. Torque is thus transferred from the input shaft 12 through the third input clutch 116 to third intermediate shaft 22 to gear 72. Gear 72 transfers the torque to gear 74. Gear 74 transfers torque to first countershaft 24. Torque is then transferred from the first countershaft 24 to synchronizer 124. Synchronizer 124 transfers the torque to gear 96. Gear 96 transfers torque to gear 92. Gear 92 transfers the torque to the output shaft 14.

A subsequent forward torque ratio indicated as Gear State 6th in the truth table of FIG. 2 is established with the engagement of input clutch 112 and synchronizers 122 and 124. The input clutch 112 connects the first intermediate shaft 18 with the input shaft 12. Torque is thus transferred from the input shaft 12 through the first input clutch 112 to first intermediate shaft 18 to gear 42. Gear 42 transfers the torque to gear 46. Gear 46 transfers torque to second countershaft 26. Torque is then transferred from the second countershaft 26 to synchronizer 122. Synchronizer 122 transfers the torque to gear 84. Gear 84 transfers the torque to gear 82. Gear 82 transfers the torque to gear 72 through third intermediate shaft 22. Gear 72 transfers the torque to gear 74. Gear 74 transfers torque to first countershaft 24. Torque is then transferred from the first countershaft 24 to synchronizer 124. Synchronizer 124 transfers the torque to gear 96. Gear 96 transfers torque to gear 92. Gear 92 transfers the torque to the output shaft 14.

A subsequent forward torque ratio indicated as Gear State 7th in FIG. 2, is established with the engagement of input clutch 116 and synchronizers 122 and 126. The input clutch 116 connects the third intermediate shaft 22 with the input shaft 12. Torque is thus transferred from the input shaft 12 through the third input clutch 116 to third intermediate shaft 22 to gear 82. Gear 82 transfers the torque to gear 84. Gear 84 transfers torque to synchronizer 122. Synchronizer 122 transfers the torque to second countershaft 26. Torque is then transferred from the second countershaft 26 to synchronizer 126. Synchronizer 126 transfers the torque to gear 104. Gear 104 transfers torque to gear 102. Gear 102 transfers the torque to the output shaft 14.

The next subsequent forward torque ratio, indicated as Gear State 8th in the truth table of FIG. 2, is established with the engagement of the first input clutch 112 and synchronizer 126. The first input clutch 112 connects the first intermediate shaft 18 with the input shaft 12. Torque is thus transferred from the input shaft 12 through the first input clutch 112 to first intermediate shaft 18 to gear 42. Gear 42 transfers the torque to gear 46. Gear 46 transfers torque to second countershaft 26. Torque is then transferred from the second countershaft 26 to synchronizer 126. Synchronizer 126 transfers the torque to gear 104. Gear 104 transfers torque to gear 102. Gear 102 transfers the torque to the output shaft 14.

The next subsequent forward torque ratio, indicated as Gear State 9th in the truth table of FIG. 2, is established with the engagement of the second input clutch 114 and synchronizers 122 and 126. The second input clutch 114 connects the second intermediate shaft 20 with the input shaft 12. Torque is thus transferred from the input shaft 12 through the second input clutch 114 to second intermediate shaft 20 to gear 62. Gear 62 transfers the torque to gear 64. Gear 64 transfers torque to synchronizer 122. Synchronizer 122 transfers the torque to second countershaft 26. Torque is then transferred from the second countershaft 26 to synchronizer 126. Synchronizer 126 transfers the torque to gear 104. Gear 104 transfers torque to gear 102. Gear 102 transfers the torque to the output shaft 14.

A subsequent forward torque ratio indicated as Gear State 10th in FIG. 2, is established with the engagement of third input clutch 116 and synchronizer 124. The input clutch 116 connects the third intermediate shaft 22 with the input shaft 12. Torque is thus transferred from the input shaft 12 through the third input clutch 116 to third intermediate shaft 22 to gear 72. Gear 72 transfers the torque to gear 74. Gear 74 transfers torque to first countershaft 24. Torque is then transferred from the first countershaft 24 to synchronizer 124. Synchronizer 124 transfers the torque to gear 106. Gear 106 transfers torque to gear 102. Gear 102 transfers the torque to the output shaft 14.

A subsequent forward torque ratio indicated as Gear State 11th in FIG. 2, is established with the engagement of first input clutch 112 and synchronizers 122 and 124. The input clutch 112 connects the first intermediate shaft 18 with the input shaft 12. Torque is thus transferred from the input shaft 12 through the first input clutch 112 to first intermediate shaft 18 to gear 42. Gear 42 transfers the torque to gear 46. Gear 46 transfers torque to second countershaft 26. Torque is then transferred from the second countershaft 26 to synchronizer 122. Synchronizer 122 transfers the torque to gear 84. Gear 84 transfers the torque to gear 82. Gear 82 transfers the torque to gear 72 through third intermediate shaft 22. Gear 72 transfers the torque to gear 74. Gear 74 transfers torque to first countershaft 24. Torque is then transferred from the first countershaft 24 to synchronizer 124. Synchronizer 124 transfers the torque to gear 106. Gear 106 transfers torque to gear 102. Gear 102 transfers the torque to the output shaft 14.

A subsequent forward torque ratio indicated as Gear State 12th in FIG. 2, is established with the engagement of third input clutch 116 and synchronizers 120, 122 and 124. The third input clutch 116 connects the third intermediate shaft 22 with the input shaft 12. Torque is thus transferred from the input shaft 12 through the third input clutch 116 to third intermediate shaft 22 to gear 72. Gear 72 transfers the torque to gear 74. Gear 74 transfers the torque to first countershaft 24. First countershaft 24 transfers torque to synchronizer 120. Synchronizer 120 transfers the torque to gear 54. Gear 54 transfers the torque to gear 52. Gear 52 transfers the torque to gear 62 through second intermediate shaft 20. Gear 62 transfers the torque to gear 64. Gear 64 transfers torque to synchronizer 122. Synchronizer 122 transfers the torque to second countershaft 26. Torque is then transferred from the second countershaft 26 to synchronizer 126. Synchronizer 126 transfers the torque to gear 104. Gear 104 transfers torque to gear 102. Gear 102 transfers the torque to the output shaft 14.

The present invention contemplates that downshifts follow essentially the reverse sequence of the corresponding upshift (as described above), and several power-on skip-shifts are possible. Moreover, as indicated in FIG. 2, column 14, gear ratios one through twelve are clutch to clutch power on shifts. The subsequent ratios labeled UD1 through UD6 are additional ratios that may be obtained through the engagement of input clutches 112, 114, and 116 and synchronizers 120, 122, 124 and 126, as prescribed in the table of FIG. 2. However, ratios UD1 through UD6 are power interrupt shifts that require shifting through neutral (TNS), as indicated in Col. 14 of the table of FIG. 2. Additionally, the transmission 10 of the present invention is configured to provide additional gear ratios RUD1 through RUD4 and ROD1, as shown at the bottom of the table of FIG. 2.

Figure 3:
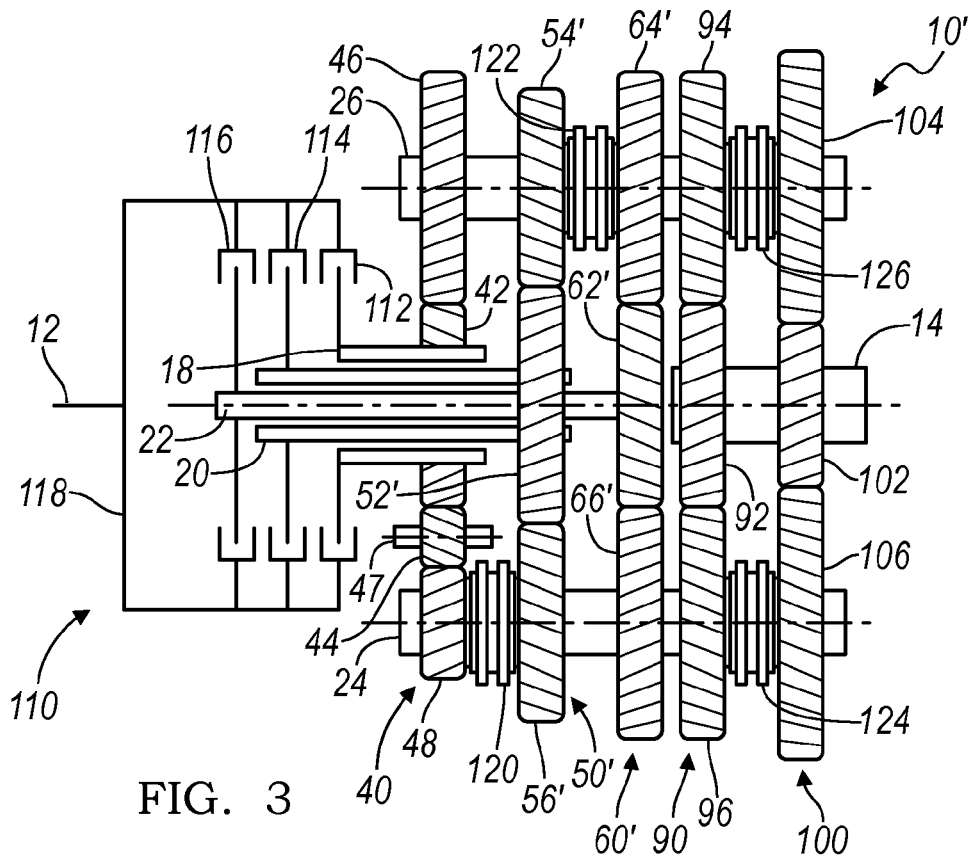
FIG. 3 is a schematic representation of another embodiment of a twelve speed transmission having a reduced axial length in accordance with the present invention.

Referring now to FIG. 3, another embodiment of the present invention is illustrated and referenced as transmission 10'. Transmission 10' is similar to transmission 10 of FIG. 1 and is also capable of producing at least twelve forward gears and one reverse gear. Transmission 10' has the same triple input clutch 110, intermediate shafts 18, 20, and 22, input shaft 12, output shaft 14, first and second countershafts 24, 26, and co-planar gear sets 40, 90 and 100, as transmission 10. However, co-planar gear sets 50, 60, 70 and 80 have been replaced by reconfigured co-planar gear sets 50' and 60'. Co-planar gear set 50' has three intermeshing gears 52', 54' and 56'. Gear 52' is rotatably fixed for common rotation with second intermediate shaft 20 and intermeshes with gears 54' and 56'. Gear 54' is rotatable about and selectively connectable for common rotation with the second countershaft 26. Gear 56' is rotatable about and selectively connectable for common rotation with the first countershaft 24. Gear 62' is rotatably fixed for common rotation with third intermediate shaft 22 and intermeshes with gears 64' and 66'. Gear 64' is rotatable about and selectively connectable for common rotation with the second countershaft 26. Gear 66' is rotatable about and selectively connectable for common rotation with the first countershaft 24. Accordingly, the instant embodiment has five co-planar gear sets 40, 50', 60', 90 and 100 as compared to the seven co-planar gear sets 40, 50, 60, 70, 80, 90 and 100 of transmission 10, illustrated in FIG. 1. Thus, beneficially transmission 10' has a reduced axial length as compared to transmission 10.

Figure 4:
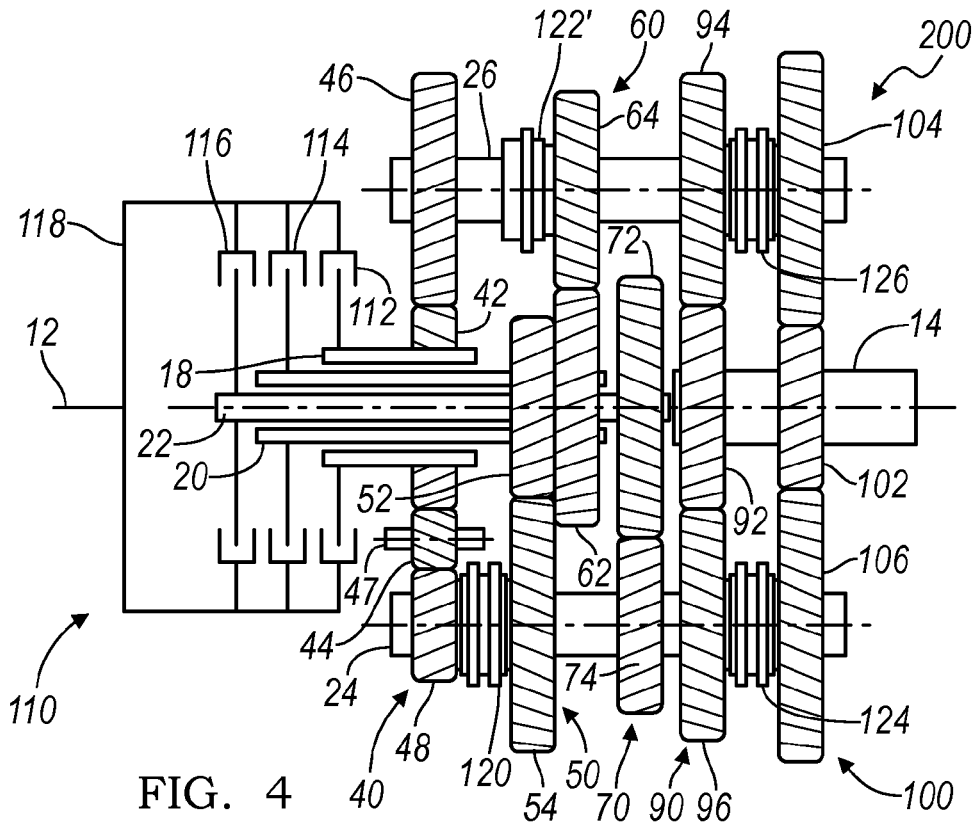
FIG. 4 is a schematic representation of an embodiment of an eleven speed transmission in accordance with the present invention.

Referring now to FIG. 4, another embodiment of the present invention is illustrated and referenced as transmission 200. Transmission 200 is similar to transmission 10 of FIG. 1. Transmission 200 has the same triple input clutch 110, intermediate shafts 18, 20, and 22, input shaft 12, output shaft 14, first and second countershafts 24, 26, and co-planar gear sets 40, 50, 60, 70, 90 and 100, as transmission 10. However, co-planar gear set 80 has been eliminated and synchronizer 122 has been replaced by a single sided synchronizer 122'. Synchronizer 122' is selectively engageable to connect gear 64 for common rotation with the second countershaft 26. Thus, beneficially transmission 200 has a reduced axial length as compared to transmission 10.

The transmission 200 is capable of transmitting torque from the input shaft 12 to the output shaft 14 in at least eleven forward torque ratios and one reverse torque ratio as indicated in the truth table of FIG. 5. Each of the forward torque ratios and the reverse torque ratio is attained by engagement of one of the first, second, third torque-transmitting mechanisms or input clutches 112, 114 and 116 and one or more of the synchronizers 120, 122', 124 and 126, as indicated in the table of FIG. 5 by the "x" in the box. Moreover, as indicated in FIG. 5, column 14, gear ratios two through eleven are clutch to clutch power on shifts. The subsequent ratio labeled UD1 is an additional ratio that may be obtained through the engagement of input clutches 112, 114, and 116 and synchronizers 120, 122, 124 and 126, as prescribed in the table of FIG. 5. However, ratio UD1 is a power interrupt shift that requires shifting through neutral (TNS), as indicated in Col. 13 of the table of FIG. 5. Additionally, the transmission 200 of the present invention is configured to provide additional gear ratios RUD1, RUD2 and ROD1, as shown at the bottom of the table of FIG. 5.

Figure 6:
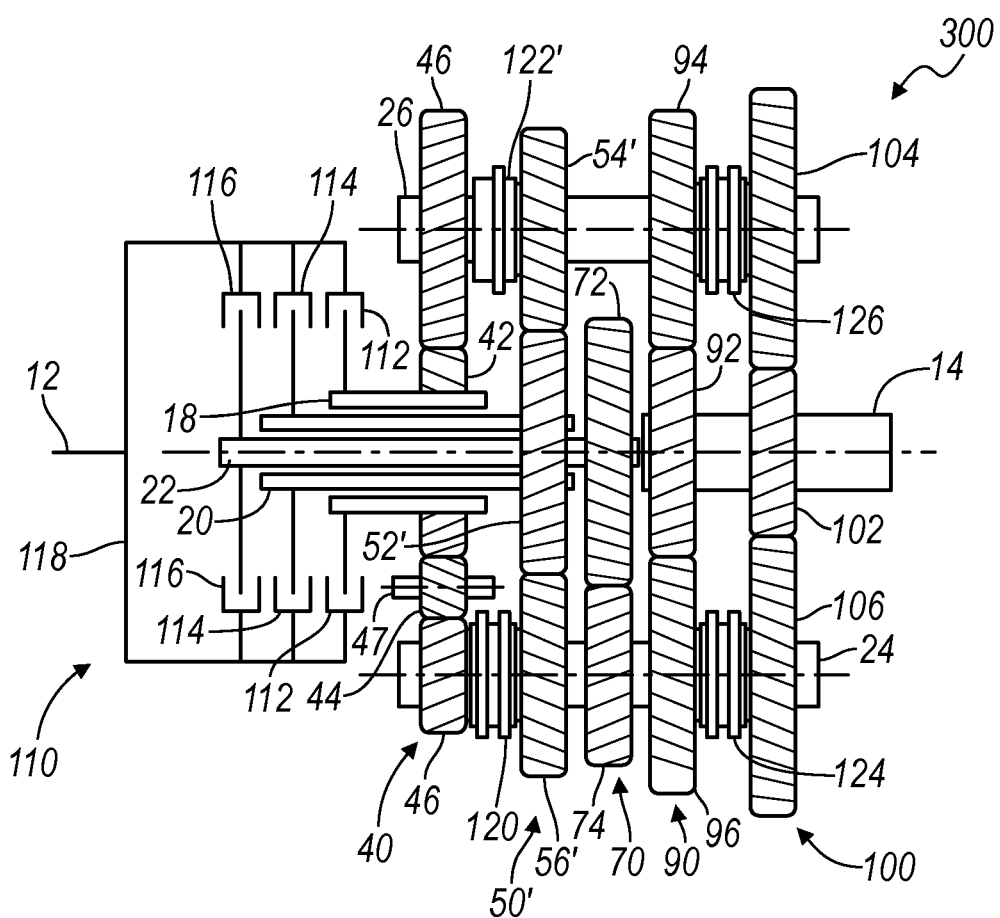
FIG. 6 is a schematic representation of another embodiment of an eleven speed transmission having a reduced axial length in accordance with the present invention.

Referring now to FIG. 6, another embodiment of the present invention is illustrated and referenced as transmission 300. Transmission 300 is similar to transmission 200 of FIG. 4. Transmission 300 has the same triple input clutch 110, intermediate shafts 18, 20, and 22, input shaft 12, output shaft 14, first and second countershafts 24, 26, and co-planar gear sets 40, 70, 90 and 100, as transmission 10. However, co-planar gear sets 50 and 60 have been replaced by reconfigured co-planar gear set 50'. Co-planar gear set 50' has three intermeshing gears 52', 54' and 56'. Gear 52' is rotatably fixed for common rotation with second intermediate shaft 20 and intermeshes with gears 54' and 56'. Gear 54' is rotatable about and selectively connectable for common rotation with the second countershaft 26. Gear 56' is rotatable about and selectively connectable for common rotation with the first countershaft

24. Furthermore, synchronizer 122' is selectively engageable to connect gear 54' for common rotation with the second countershaft 26. Accordingly, the instant embodiment has five co-planar gear sets 40, 50', 70, 90 and 100 as compared to the six co-planar gear sets 40, 50, 60, 70, 90 and 100 of transmission 200, illustrated in FIG. 4. Thus, beneficially transmission 300 has a reduced axial length as compared to transmission 200.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member;
an output member;
a first intermediate input shaft;
a second intermediate input shaft, wherein the second intermediate input shaft is concentric with the first intermediate shaft;
a third intermediate input shaft, wherein the third intermediate input shaft is concentric with the second intermediate shaft;
a clutch assembly having a first, a second and a third torque-transmitting mechanism each selectively engageable to connect the input member with a respective different one of the first intermediate input shaft, second intermediate input shaft and third intermediate input shaft;
a first countershaft radially offset from the intermediate input shafts;
a second countershaft radially offset from the intermediate input shafts;
a first countershaft transfer gear connected for common rotation with the first countershaft and in communication with the output member to transfer torque from the first countershaft to the output member;
a second countershaft transfer gear connected for common rotation with the first countershaft and in communication with the output member to transfer torque from the first countershaft to the output member;
a third countershaft transfer gear connected for common rotation with the second countershaft and in communication with the output member to transfer torque from the second countershaft to the output member;
a fourth countershaft transfer gear connected for common rotation with the second countershaft and in communication with the output member to transfer torque from the second countershaft to the output member;
at least five co-planar intermeshing gear sets, wherein at least one of the gears of the at least five co-planar intermeshing gear sets is fixed for common rotation with at least one of the intermediate input shafts;
a plurality of synchronizers, wherein at least one of the plurality of synchronizers is selectively engagable to connect at least one of the gears of the at least five co-planar intermeshing gear sets with at least one of the first and second countershafts for common rotation therewith;
a first output shaft gear rotationally fixed to the output member and in mesh with both the first and third countershaft transfer gears; and
a second output shaft gear rotationally fixed to the output member and in mesh with both the second and fourth countershaft transfer gears, and wherein the combination of engagement of the first, the second and the third torque-transmitting mechanism and the synchronizers transfers torque from the input member to the output member to establish a plurality of gear speeds.

2. The transmission of claim 1 wherein the first torque-transmitting mechanism is selectively engageable to connect the input member with first intermediate input shaft, the second torque-transmitting mechanism is selectively engageable to connect the input member with the second intermediate input shaft and the third torque-transmitting mechanism is selectively engageable to connect the input member with the third intermediate input shaft.

3. The transmission of claim 1 wherein one of the at least five co-planar intermeshing gears includes a first gear in mesh with a second gear and a third gear and wherein the third gear is in mesh with a fourth gear.

4. The transmission of claim 3 wherein four of the at least five co-planar intermeshing gears includes a first gear in mesh with a second gear.

5. The transmission of claim 1 wherein the first gear of the first co-planar intermeshing gear set of the at least five co-planar intermeshing gear sets is fixedly connected to the third intermediate input shaft.

6. The transmission of claim 1 wherein the first gears of the second and third co-planar intermeshing gear sets of the at least five co-planar intermeshing gear sets are fixedly connected to the second intermediate input shaft.

7. The transmission of claim 1 wherein the first gears of the fourth and fifth co-planar intermeshing gear sets of the at least five co-planar intermeshing gear sets are fixedly connected to the first intermediate input shaft.

8. The transmission of claim 3 wherein the second gears of at least two of the at least five co-planar intermeshing gear sets and the fourth gear of at least one of the at least five co-planar intermeshing gear sets are selectively engageable with the first countershaft and the second gears of at least three of the at least five co-planar intermeshing gear sets are selectively engageable with the second countershaft.

9. The transmission of claim 3 wherein the plurality of synchronizers further includes a first synchronizer for selectively connecting the fourth gear of a first of the at least five co-planar intermeshing gear sets and the second gear of a second of the at least five co-planar intermeshing gear sets with the first countershaft.

10. The transmission of claim 3 wherein the plurality of synchronizers further includes a second synchronizer for selectively connecting the second gear of a third of the at least five co-planar intermeshing gear sets and the second gear of a fourth of the at least five co-planar intermeshing gear sets with the second countershaft.

11. The transmission of claim 1 wherein the plurality of synchronizers further includes a third synchronizer for selectively connecting the first transfer gear and the second transfer gear with the first countershaft.

12. The transmission of claim 11 wherein the plurality of synchronizers further includes a fourth synchronizer for selectively connecting the third transfer gear and the fourth transfer gear with the second countershaft.

13. A transmission comprising:
an input member;
an output member;
a first intermediate input shaft;
a second intermediate input shaft, wherein the second intermediate input shaft is concentric with the first intermediate shaft;

a third intermediate input shaft, wherein the third intermediate input shaft is concentric with the second intermediate shaft;
a clutch assembly having a first, a second and a third torque-transmitting mechanism each selectively engageable to connect the input member with a respective different one of the first intermediate input shaft, the second intermediate input shaft and the third intermediate input shaft;
a first countershaft radially offset from the intermediate input shafts;
a second countershaft radially offset from the intermediate input shafts;
a first countershaft transfer gear connected for common rotation with the first countershaft and in communication with the output member to transfer torque from the first countershaft to the output member;
a second countershaft transfer gear connected for common rotation with the first countershaft and in communication with the output member to transfer torque from the first countershaft to the output member;
a third countershaft transfer gear connected for common rotation with the second countershaft and in communication with the output member to transfer torque from the second countershaft to the output member;
a fourth countershaft transfer gear connected for common rotation with the second countershaft and in communication with the output member to transfer torque from the second countershaft to the output member;
a first co-planar intermeshing gear set having a first gear, a second gear, a third gear and a fourth gear, wherein the first gear is in mesh with the second gear and the third gear, and wherein the third gear is in mesh with the fourth gear, and wherein the first gear is fixed for common rotation with the third intermediate input shaft and the second gear is fixed for common rotation with the second countershaft;
a second co-planar intermeshing gear set having a first gear, a second gear and a third gear, wherein the first gear is in mesh with the second gear and the third gear and wherein the first gear of the second co-planar intermeshing gear set is fixed for common rotation with the second intermediate input shaft;
a third co-planar intermeshing gear set having a first gear, a second gear and a third gear, wherein the first gear is in mesh with the second gear and the third gear and wherein the first gear is fixed for common rotation with the first intermediate input shaft and the third gear is fixed for common rotation with the second countershaft;
a first synchronizer for selectively connecting the fourth gear of the first co-planar intermeshing gear set and the third gear of the second co-planar intermeshing gear set with the first countershaft;
a second synchronizer for selectively connecting the second gear of the second co-planar intermeshing gear set and the second gear of the third co-planar intermeshing gear set with the second countershaft;
a third synchronizer for selectively connecting the first countershaft transfer gear and the second countershaft transfer gear with the first countershaft;
a fourth synchronizer for selectively connecting the third countershaft transfer gear and the fourth countershaft transfer gear with the second countershaft; and
wherein at least one of the first, the second and the third torque-transmitting mechanism and at least one of the synchronizers are selectively engagable to connect at least one of the gears of the three co-planar intermeshing gear sets with at least one of the first and second countershafts for common rotation therewith to transfer torque from the input member to the output member to establish a gear speed.

14. A transmission comprising:
an input member;
an output member;
a first intermediate input shaft;
a second intermediate input shaft, wherein the second intermediate input shaft is concentric with the first intermediate shaft;
a third intermediate input shaft, wherein the third intermediate input shaft is concentric with the second intermediate shaft;
a clutch assembly having a first, a second and a third torque-transmitting mechanism each selectively engageable to connect the input member with a respective different one of the first intermediate input shaft, second intermediate input shaft and third intermediate input shaft;
a first countershaft radially offset from the intermediate input shafts;
a second countershaft radially offset from the intermediate input shafts;
a first countershaft transfer gear connected for common rotation with the first countershaft and in communication with the output member to transfer torque from the first countershaft to the output member;
a second countershaft transfer gear connected for common rotation with the first countershaft and in communication with the output member to transfer torque from the first countershaft to the output member;
a third countershaft transfer gear connected for common rotation with the second countershaft and in communication with the output member to transfer torque from the second countershaft to the output member;
a fourth countershaft transfer gear connected for common rotation with the second countershaft and in communication with the output member to transfer torque from the second countershaft to the output member;
a first co-planar intermeshing gear set having a first gear, a second gear, a third gear and a fourth gear, wherein the first gear is in mesh with the second gear and the third gear, and wherein the third gear is in mesh with the fourth gear, and wherein the first gear is fixed for common rotation with the third intermediate input shaft and the second gear is fixed for common rotation with the second countershaft;
a second co-planar intermeshing gear set having a first gear and a second gear, wherein the first gear is in mesh with the second gear and wherein the first gear is fixed for common rotation with the second intermediate input shaft;
a third co-planar intermeshing gear set having a first gear and a second gear, wherein the first gear is in mesh with the second gear and wherein the first gear is fixed for common rotation with the second intermediate input shaft;
a fourth co-planar intermeshing gear set having a first gear and a second gear, wherein the first gear is in mesh with the second gear and wherein the first gear is fixed for common rotation with the first intermediate input shaft and the second gear is fixed for common rotation with the first countershaft;
a first synchronizer for selectively connecting the fourth gear of the first co-planar intermeshing gear set and the second gear of the second co-planar intermeshing gear set with the first countershaft;

a second synchronizer for selectively connecting the second gear of the third co-planar intermeshing gear set with the second countershaft;

a third synchronizer for selectively connecting the first countershaft transfer gear and the second countershaft transfer gear with the first countershaft;

a fourth synchronizer for selectively connecting the third countershaft transfer gear and the fourth countershaft transfer gear with the second countershaft; and wherein at least one of the first, the second and the third torque-transmitting mechanism and at least one of the synchronizers are selectively engagable to connect at least one of the gears of the four co-planar intermeshing gear sets with at least one of the first and second countershafts for common rotation therewith to transfer torque from the input member to the output member to establish a gear speed.

15. A transmission comprising:

an input member;

an output member;

a first intermediate input shaft;

a second intermediate input shaft, wherein the second intermediate input shaft is concentric with the first intermediate shaft;

a third intermediate input shaft, wherein the third intermediate input shaft is concentric with the second intermediate shaft;

a clutch assembly having a first, a second and a third torque-transmitting mechanism each selectively engageable to connect the input member with a respective different one of the first intermediate input shaft, second intermediate input shaft and third intermediate input shaft;

a first countershaft radially offset from the intermediate input shafts;

a second countershaft radially offset from the intermediate input shafts;

a first countershaft transfer gear connected for common rotation with the first countershaft and in communication with the output member to transfer torque from the first countershaft to the output member;

a second countershaft transfer gear connected for common rotation with the first countershaft and in communication with the output member to transfer torque from the first countershaft to the output member;

a third countershaft transfer gear connected for common rotation with the second countershaft and in communication with the output member to transfer torque from the second countershaft to the output member;

a fourth countershaft transfer gear connected for common rotation with the second countershaft and in communication with the output member to transfer torque from the second countershaft to the output member;

a first co-planar intermeshing gear set having a first gear, a second gear, a third gear and a fourth gear, wherein the first gear is in mesh with the second gear and the third gear, and wherein the third gear is in mesh with the fourth gear, and wherein the first gear is fixed for common rotation with the third intermediate input shaft and the second gear is fixed for common rotation with the second countershaft;

a second co-planar intermeshing gear set having a first gear, a second gear and a third gear, wherein the first gear is in mesh with the second gear and the third gear and wherein the first gear is fixed for common rotation with the second intermediate input shaft;

a third co-planar intermeshing gear set having a first gear and a second gear, wherein the first gear is in mesh with the second gear and wherein the first gear is fixed for common rotation with the first intermediate input shaft and the second gear is fixed for common rotation with the first countershaft;

a first synchronizer for selectively connecting the fourth gear of the first co-planar intermeshing gear set and the third gear of the second co-planar intermeshing gear set with the first countershaft;

a second synchronizer for selectively connecting the second gear of the second co-planar intermeshing gear set with the second countershaft;

a third synchronizer for selectively connecting the first countershaft transfer gear and the second countershaft transfer gear with the first countershaft;

a fourth synchronizer for selectively connecting the third countershaft transfer gear and the fourth countershaft transfer gear with the second countershaft; and wherein at least one of the first, the second and the third torque-transmitting mechanism and at least one of the synchronizers are selectively engagable to connect at least one of the gears of the three co-planar intermeshing gear sets with at least one of the first and second countershafts for common rotation therewith to transfer torque from the input member to the output member to establish a gear speed.

* * * * *